(12) United States Patent
Evjen et al.

(10) Patent No.: US 7,243,942 B2
(45) Date of Patent: Jul. 17, 2007

(54) SIDE IMPACT AIRBAG DISABLE SWITCH

(75) Inventors: Victor Claude Evjen, Highland, MI (US); Jon Theodore Riley, Waterford, MI (US)

(73) Assignees: Intier Automotive Inc., Newmarket (CA); Link Technologies Inc., Romeo, MI (US)

( * ) Notice: Subject to any disclaimer, the term of this patent is extended or adjusted under 35 U.S.C. 154(b) by 195 days.

(21) Appl. No.: 10/503,531

(22) PCT Filed: Feb. 4, 2003

(86) PCT No.: PCT/US03/03284

§ 371 (c)(1),
(2), (4) Date: Mar. 18, 2005

(87) PCT Pub. No.: WO03/066387

PCT Pub. Date: Aug. 14, 2003

(65) Prior Publication Data

US 2005/0156418 A1    Jul. 21, 2005

Related U.S. Application Data

(60) Provisional application No. 60/354,111, filed on Feb. 4, 2002.

(51) Int. Cl.
*B60R 21/16* (2006.01)

(52) U.S. Cl. ............... 280/730.1; 180/271; 280/730.2; 280/735

(58) Field of Classification Search ............... 280/735, 280/728.1, 730.1, 730.2; 180/271; 307/10.1
See application file for complete search history.

(56) References Cited

U.S. PATENT DOCUMENTS

| 6,040,637 A | 3/2000 | Paganini et al. |
| 6,133,648 A | 10/2000 | Titus et al. |
| 6,273,460 B1 | 8/2001 | Cox |

FOREIGN PATENT DOCUMENTS

JP    2001/301460 A    10/2001

*Primary Examiner*—Eric Culbreth
(74) *Attorney, Agent, or Firm*—Honigman Miller Schwartz and Cohn LLP

(57) ABSTRACT

A switch (60) is provided for disabling an airbag assembly (20) in an automotive vehicle when a sun visor (30) in the vehicle is positioned within a defined deployment area of the airbag assembly. The sun visor is movable in and out of the deployment area during regular use. A switch is adapted for signaling the presence or absence of the sun visor in the deployment area, and accordingly disables or enables the airbag assembly, respectively.

12 Claims, 2 Drawing Sheets

SIDE IMPACT AIRBAG DISABLE SWITCH

BACKGROUND OF THE INVENTION

1. Field of the Invention

This invention relates to side impact airbag systems in automotive vehicles, and more particularly, to a switch for disabling the side impact airbag system in response to movement of a sun visor into the deployment area of the airbag.

2. Description of the Prior Art

Automotive vehicles commonly include side impact airbag systems to protect an occupant during an impact directed at the side of the vehicle. The airbag system typically includes an inflatable bag deployable between the occupant and sidewall of the vehicle immediately adjacent the occupant. The airbag system further includes a trigger means for deploying the bag in response to the side impact upon the vehicle. Vehicles also commonly include sun visors pivotally assembled to the roof, headliner or A-pillar of the vehicle for shielding the eyes of the occupant from the sun, or other bright light sources. The visor is typically movable through a plurality of positions between the windshield and a side window adjacent the occupant. However, while occupying one of the positions between the windshield and the side window, the visor may interfere with the deployment of the bag or intended direction of deployment of the bag.

Therefore, it remains desirable to provide a switch for disabling the airbag system when the visor is moved between the windshield and side window.

SUMMARY OF THE INVENTION

According to one aspect of the invention, there is provided an airbag disable system for an automotive vehicle comprising an airbag assembly for inflating and discharging an inflatable bag into a deployment area in response to an impact upon the vehicle; a visor pivotally assembled to the vehicle and movable between a plurality of positions in and out of the deployment area; and a switch coupled between the airbag assembly and the visor for disabling the airbag assembly when the visor is positioned within the deployment area.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
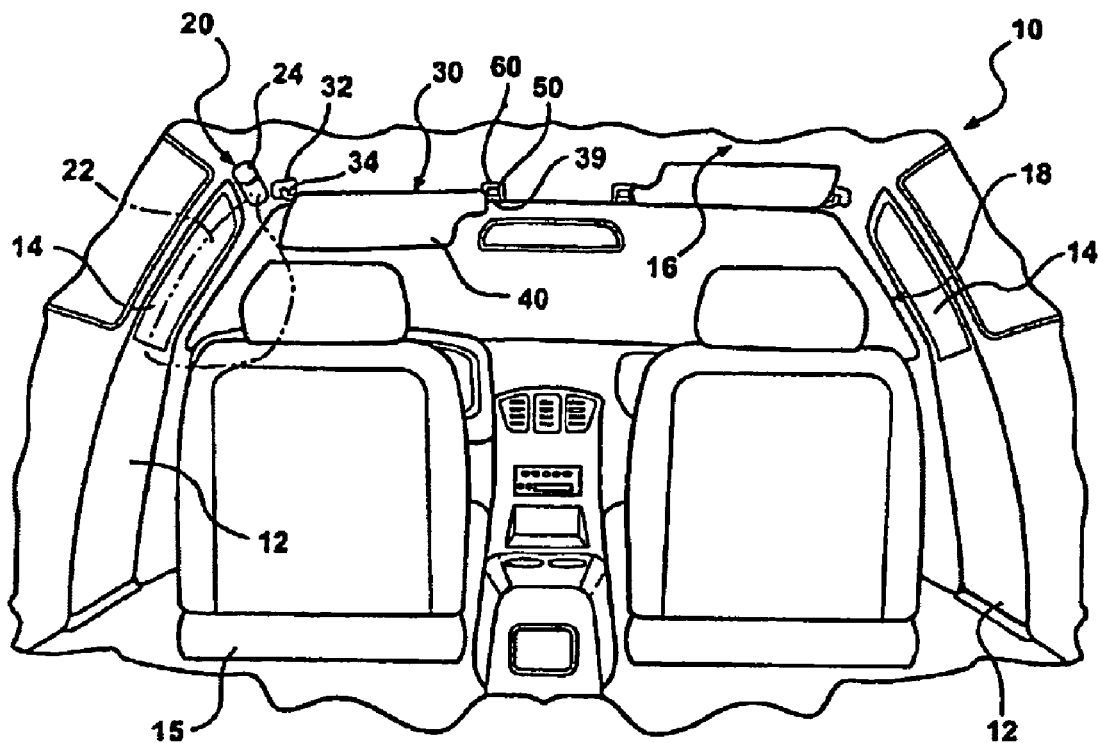
FIG. 1 is perspective view of a forward interior cabin of an automotive vehicle incorporating a side impact airbag disable system according to the invention.

Referring to the figures, FIG. 1 illustrates a forward cabin 10 of an automotive vehicle and a seat 15 in the forward cabin 10 for supporting an occupant within the vehicle. The forward cabin 10 spans between laterally opposing side doors 12 each having a window 14. A generally horizontal roof 16 and a generally vertical front windshield 18 each extend between the side doors 12.

Figure 2:
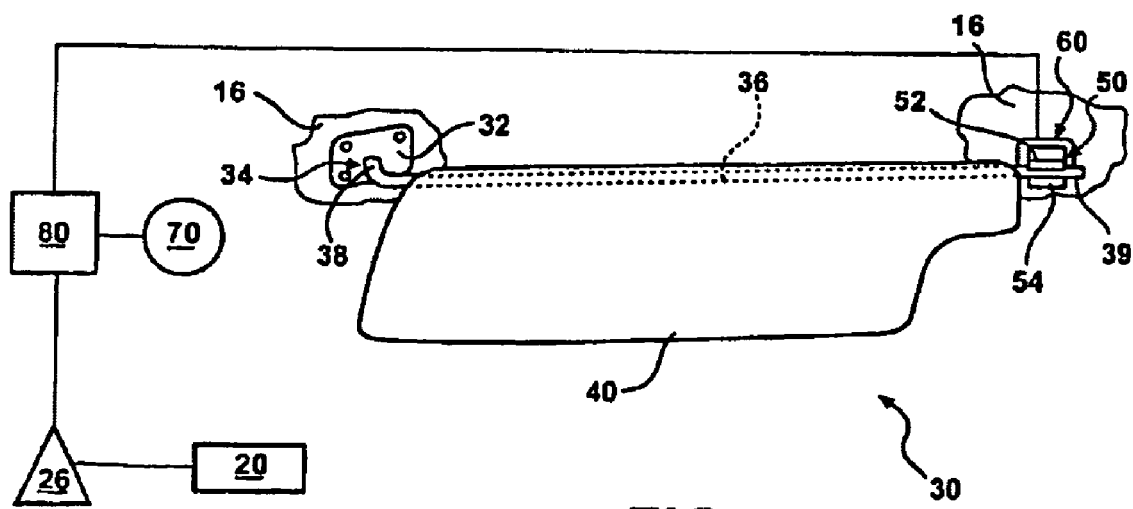
FIG. 2 is a schematic illustration of an airbag assembly incorporating the side impact airbag disable system according to the invention.

An airbag assembly 20 is fixedly secured to the roof 16 of the vehicle preferably adjacent the side door 12 by bolts, or other fixing means. The airbag assembly 20 includes a bag 22 stored in a folded position within a frangible housing 24. Shown schematically in FIG. 2, the bag 22 is rapidly inflatable by an inflating device 26, such as a pyrotechnic device. Rapid inflation of the bag 22 ruptures the housing 24 and discharges the bag 22 from the folded position within the housing 24 to an expanded position into a deployment area disposed between the occupant of the seat 15 and the side door 12, as best illustrated by phantom lines in FIG. 1.

A visor assembly 30 extends from the roof 16 and is pivotally adjustable relative to the roof 16 for shielding the occupant from light passing through the window 14 or windshield 18. More specifically, referring to FIG. 2, the visor assembly 30 includes a bracket 32 fixedly secured to the roof 16 by bolts, or other suitable means, such as welding. The visor assembly 30 also includes an L-shaped arm 34 having a generally horizontal cantilevered portion 36 and a generally vertical portion 38 pivotally coupled to the bracket 32 allowing the cantilevered portion 36 to swing through a plurality of positions between a forward position aligned with the windshield 18 and a side position aligned with the window 14. The cantilevered portion 36 terminates at a distal end 39. A substantially rigid and planar visor flap 40 is rotatably supported by the cantilevered portion 36 allowing rotation of the visor flap 40 through a plurality of positions between a generally horizontal position aligned with the roof 16 and a generally vertical position suited for shielding the eyes of the occupant from light passing through the windshield 18 or window 14.

A support 50 is fixedly secured to the roof 16 for supporting the distal end 39 of the cantilevered portion 36 in the forward position, or stored generally horizontal position aligned with the roof 16. The support 50 includes hooked fingers 52, 54 adapted for surrounding and holding the girth of the distal end 39. While the distal end 39 is held between the fingers 52, 54 of the support 50, the visor flap 40 remains movable between the roof 16 and the windshield 18. Further, while the distal end 39 is held by the fingers 52, 54 of the support 50, the visor flap 40 is not within the deployment area of the bag 22 and will not swing into the deployment area during accelerations of the vehicle.

A switch 60 is mounted to the support 50 for engaging or sensing the distal end 39 while seated between the fingers 52, 54. The switch 60 provides an on signal to the airbag assembly 20 when the distal end 39 is positioned between the fingers 52, 54 of the support 50, or alternatively, when the distal end 39 is within close proximity of the support 50 to ensure that the visor flap 40 is not within the deployment area. More particularly, the airbag assembly 20 receives the on signal from the switch 60 when the visor is not in the deployment area of the bag 22. If the distal end 39 is not seated between the fingers 52, 54 of the support 50, or at least in the proximity thereof, then the visor flap 40 is potentially within the deployment area of the bag 22. Accordingly, the switch 60 provides an off signal to the airbag assembly 20 when the distal end 39 is not positioned between the fingers 52, 54 of the support 50, or at least, not within a predetermined proximity of the support 50.

The airbag assembly 20 includes a controller 80 for receiving and interpreting signals from both the switch 60 and a collision sensor 70 and for triggering the inflating means 26 in the airbag assembly 20. The controller 80 will trigger the inflating device 26 only when it receives both a signal from the collision sensor 70 resulting from a vehicle collision and an on signal from the switch 60. If the controller 80 receives a signal from the collision sensor 70 while receiving an off signal from the switch 60, the controller 80 will not trigger the inflating device 26 thereby disabling the airbag assembly 20. Thus, the airbag assembly 20 is disabled if the distal end 39 of the visor assembly 30 is not seated between the fingers 52, 54 of the support 50.

Figure 3:
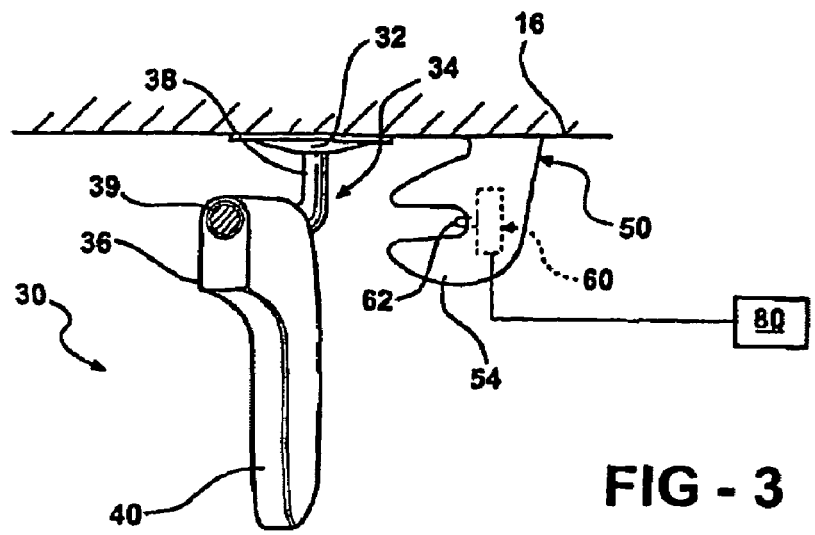
FIG. 3 is a perspective view of a visor assembly incorporating one embodiment of the side impact airbag disable switch.

In FIG. 3, one embodiment of the switch 60 is illustrated. The switch 60 includes a push button 62 projecting between the fingers 52, 54. While held between the fingers 52, 54, the distal end 39 engages the push button 62 causing the switch 60 to send an on signal to the controller 80. When the distal end 39 is not held between the fingers 52, 54, the switch 60 sends an off signal to the controller 80.

Figure 4:
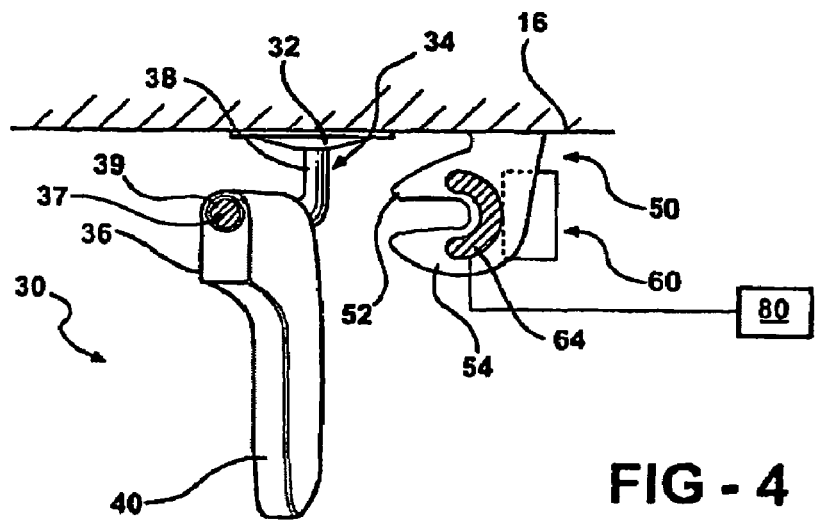
FIG. 4 is a perspective view of the visor assembly incorporating a second embodiment of the side impact airbag disable switch.

In FIG. 4, a second embodiment of the switch 60 is illustrated. The switch 60 includes a magnetic sensor 64 located in the support 50 for sensing the presence of a magnetic or ferrite core 37 embedded in the distal end 39. When the distal end 39, and thus core 37, is in the proximity of the magnetic sensor 64, the switch 60 sends an on signal to the controller 80.

Figure 5:
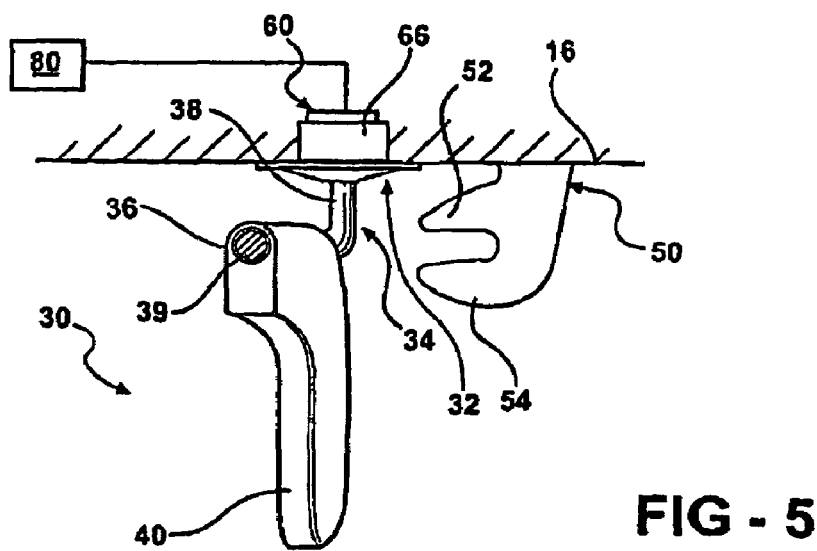
FIG. 5 is a perspective view of the visor assembly incorporating a third embodiment of the side impact airbag disable switch.

In FIG. 5, a third embodiment of the switch 60 is illustrated. The switch 60 includes a sensor 66 for sensing the angular position of the vertical portion 38 relative to the bracket 32 as a measure of the proximity of the distal end 39 from the support 50. The switch 60 is calibrated to provide an on signal to the controller when the angular position of the vertical portion 38 relative to the bracket 32 corresponds to the location of the distal end 39 between the fingers 52, 54 of the support 50, or at least within a predetermined proximity to the support 50.

The invention has been described in an illustrative manner, and it is to be understood that the terminology, which has been used, is intended to be in the nature of words of description rather than of limitation.

Many modifications and variations of the present invention are possible in light of the above teachings. It is, therefore, to be understood that within the scope of the appended claims, the invention may be practiced other than as specifically described.

What is claimed is:

1. An airbag disable system for an automotive vehicle having a roof, windshield, and windows, said airbag disable system comprising:
   an airbag assembly for inflating and discharging an inflatable airbag into a deployment area in response to an impact upon the vehicle;
   a visor assembly pivotally attached to the vehicle and movable between a plurality of positions in and out of said deployment area; and
   a switch operatively coupled between said airbag assembly and said visor assembly for disabling said airbag assembly when said visor assembly is positioned within said deployment area.

2. An airbag disable system as set forth in claim 1, wherein said visor assembly includes a bracket fixedly secured to the roof, and a substantially L-shaped arm having a generally horizontal cantilevered portion terminating at a distal end and a generally vertical portion, said bracket adapted to rotatably receive said vertical portion, thereby attaching said arm to the vehicle and allowing said cantilevered portion to swing through a plurality of positions.

3. An airbag disable system as set forth in claim 2, wherein said visor assembly further includes a visor flap rotatably supported by said cantilevered portion of said arm for allowing rotation of said visor flap between a generally horizontal position aligned with the roof of the vehicle and a generally vertical position suited for shielding eyes of the occupant from light entering through one of the windshield and windows.

4. An airbag disable system as set forth in claim 3, wherein said visor assembly further includes a support fixedly secured to the vehicle for supporting said distal end of said arm, said support including fingers adapted for surrounding and holding said distal end thereby allowing said arm to be releasably held in a stored generally horizontal position aligned with the roof.

5. An airbag disable system as set forth in claim 4, wherein said switch is mounted on said support for cooperating with said distal end of said arm and sending a signal to control deployment of said airbag assembly.

6. An airbag disable system as set forth in claim 5, wherein said switch includes a push button projecting between said fingers of said support such that when said distal end engages said push button said switch sends a signal to prevent deployment of said airbag assembly.

7. An airbag disable system as set forth in claim 5, wherein said distal end of said arm includes a magnetic core embedded within and said switch includes a magnetic sensor for sensing the proximity of said distal end to control deployment of said airbag assembly.

8. An airbag disable system as set forth in claim 5, wherein said switch includes a sensor for sensing the angular position of said vertical portion of said arm relative to said bracket to determine the proximity of said distal end of said arm from said support and therefrom controlling deployment of said airbag assembly.

9. An airbag disable system as set forth in claim 1, further including a controller operatively coupled between said airbag assembly and said switch for receiving signals and operatively controlling the deployment of said airbag assembly therefrom.

10. An airbag disable system as set forth in claim 9, further including a collision sensor operatively connected to said controller for sending a signal to said controller upon a vehicle collision.

11. An airbag disable system as set forth in claim 10, wherein said controller receives signals from said collision sensor and said switch to control deployment of said airbag assembly.

12. An airbag disable system as set forth in claim 11, further including an inflating device operatively coupled between said controller and said airbag assembly for receiving a signal from said controller and triggering the inflation of said airbag assembly.

* * * * *